(12) United States Patent
Despiegel et al.

(10) Patent No.: US 12,373,597 B2
(45) Date of Patent: Jul. 29, 2025

(54) METHOD AND SYSTEM FOR PROCESSING PERSONAL DATA

(71) Applicant: Idemia Identity & Security France, Courbevoie (FR)

(72) Inventors: Vincent Despiegel, Courbevoie (FR); Hervé Chabanne, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 354 days.

(21) Appl. No.: 17/815,800

(22) Filed: Jul. 28, 2022

(65) Prior Publication Data

US 2023/0033479 A1 Feb. 2, 2023

(51) Int. Cl.
*G06F 21/62* (2013.01)
*H04L 9/00* (2022.01)
*H04L 9/32* (2006.01)

(52) U.S. Cl.
CPC .......... *G06F 21/6245* (2013.01); *H04L 9/008* (2013.01); *H04L 9/3231* (2013.01)

(58) Field of Classification Search
CPC .... G06F 21/6245; H04L 9/008; H04L 9/3231
See application file for complete search history.

(56) References Cited

U.S. PATENT DOCUMENTS

| | | | | |
|---|---|---|---|---|
| 5,253,327 A * | 10/1993 | Yoshihara | ............... | G06Q 10/04 706/19 |
| 8,515,058 B1 | 8/2013 | Gentry | | |
| 10,474,899 B2 * | 11/2019 | Jalan | ...................... | G06F 16/583 |
| 10,726,235 B2 * | 7/2020 | Che | .......................... | G06V 40/13 |
| 11,277,258 B1 * | 3/2022 | Zhang | .................. | G06V 40/161 |
| 11,301,586 B1 * | 4/2022 | Poh | ...................... | G06F 21/6254 |
| 11,495,041 B2 * | 11/2022 | Derakhshani | ...... | G06V 40/1382 |
| 11,527,107 B1 * | 12/2022 | Mostafa | ............... | G06V 10/751 |
| 2009/0006855 A1 * | 1/2009 | Tuyls | .................... | H04L 9/3218 713/182 |
| 2014/0133710 A1 * | 5/2014 | Hama | ...................... | G06F 21/32 382/115 |

(Continued)

OTHER PUBLICATIONS

Chillotti et al., "TFHE: Fast Fully Homomorphic Encryption Over the Torus", Journal of Cryptology, vol. 33, 2020, pp. 34-91.

(Continued)

*Primary Examiner* — Jason Chiang
(74) *Attorney, Agent, or Firm* — WOMBLE BOND DICKINSON (US) LLP

(57) ABSTRACT

A method for processing personal data, comprising the steps of: (a) For each reference personal data of a reference personal database, calculating in the encrypted domain a similarity rate of the reference personal data with a candidate personal data; said reference personal database being associated with a first partition into a plurality of first sets of reference personal data, and with a second partition into a plurality of second sets of reference personal data, such that each reference personal data of a reference personal database belongs to a single first set and a single second set; (b) For each first set and each second set, calculating an overall similarity rate of said set based on the similarity rates of the reference personal data of said set; (c) Comparing each overall similarity rate of a first and second set with a first and second predetermined threshold, respectively.

13 Claims, 2 Drawing Sheets

(56) References Cited

U.S. PATENT DOCUMENTS

| | | | |
|---|---|---|---|
| 2017/0293823 A1* | 10/2017 | Furihata | G06F 18/22 |
| 2019/0026655 A1* | 1/2019 | Xie | G16H 50/70 |
| 2019/0163951 A1* | 5/2019 | Chang | G06V 40/1365 |
| 2019/0318073 A1* | 10/2019 | Lee | G06V 40/1365 |
| 2019/0363870 A1* | 11/2019 | Wagner | H04L 9/008 |
| 2020/0004939 A1* | 1/2020 | Streit | G06F 21/316 |
| 2020/0228341 A1* | 7/2020 | Mohassel | H04L 9/3218 |
| 2020/0250807 A1* | 8/2020 | Hong | G06T 7/11 |
| 2021/0124815 A1* | 4/2021 | Rindal | G06F 21/32 |
| 2021/0211290 A1* | 7/2021 | Jindal | H04L 9/008 |
| 2021/0280322 A1* | 9/2021 | Frank | G16H 50/20 |
| 2021/0365532 A1* | 11/2021 | Engelsma | G06V 40/1353 |
| 2022/0050999 A1* | 2/2022 | Zheng | H04L 9/3231 |
| 2022/0103362 A1* | 3/2022 | Chafni | G06V 40/13 |
| 2022/0131698 A1* | 4/2022 | Badrinarayanan | H04L 9/085 |
| 2022/0254449 A1* | 8/2022 | Van Hyfte | G16B 15/00 |
| 2022/0277583 A1* | 9/2022 | Derckx | G06V 40/1353 |
| 2022/0375477 A1* | 11/2022 | Tan | G10L 17/06 |
| 2022/0383663 A1* | 12/2022 | Gupta | G06V 10/82 |
| 2023/0189895 A1* | 6/2023 | Talbot | A24F 40/53 |
| | | | 131/329 |

OTHER PUBLICATIONS

Clet et al., "BFV, CKKS, TFHE: Which One is the Best for a Secure Neural Network Evaluation in the Cloud?", ACNS 2021 Workshops, LNCS 12809, 2021, pp. 279-300.

Inan et al., "Sparse Combinatorial Group Testing for Low-Energy Massive Random Access", arXiv:1711.05403v1 [cs.IT], Nov. 15, 2017, pp. 1-18.

Inan et al., "Sparse Combinatorial Group Testing", IEEE Transactions on Information Theory, vol. 66, Issue 5, May 2020, pp. 1-24.

Kim et al., "Efficient Privacy-Preserving Fingerprint-Based Authentication System Using Fully Homomorphic Encryption", Security and Communication Networks, vol. 2020, Article ID 4195852, Feb. 13, 2020, pp. 1-11.

Preliminary Research Report received for French Application No. 2108193, mailed on Apr. 9, 2022, 6 pages (1 page of French Translation Cover Sheet and 5 pages of original document).

* cited by examiner

METHOD AND SYSTEM FOR PROCESSING PERSONAL DATA

CROSS-REFERENCE TO RELATED APPLICATIONS

This application claims priority pursuant to 35 U.S.C. 119(a) to France Patent Application No. 2108193, filed Jul. 28, 2021, which application is incorporated herein by reference in its entirety.

TECHNICAL FIELD OF THE INVENTION

The invention relates to a method for processing personal data, for the comparison between one candidate personal data and a plurality of reference personal data.

STATE OF THE ART

Identification or authentication schemes are already known wherein a user presents to a trusted processing unit, for example a unit belonging to a customs office, an airport, etc., newly acquired biometric data on the user that the unit matches with one or more reference biometric data stored in a database to which it has access.

This database aggregates the reference biometric data of authorized individuals (such as passengers on a flight before boarding).

Such a solution is satisfactory but raises the problem of the confidentiality of the reference biometric database in order to guarantee user privacy. It is therefore mandatory to encrypt this database.

To avoid any unencrypted manipulation of the biometric data, it is possible to use a homomorphic encryption and to carry out the processing operations on the biometric data (typically distance calculations) in the encrypted domain. A homomorphic cryptographic system makes it possible to carry out certain mathematical operations on previously encrypted data instead of unencrypted data. Thus, for a given calculation, it becomes possible to encrypt the data, perform certain calculations associated with said given calculation on the encrypted data, and to decrypt them, obtaining the same result as if said given calculation had been performed directly on the cleartext data.

The problem is that calculations in the encrypted domain are computationally burdensome.

In Fully Homomorphic Encryption (FHE), and for example Fast Fully Homomorphic Encryption Over the Torus (TFHE) see for example the paper *Programmable Bootstrapping Enables Efficient Homomorphic Inference of Deep Neural Networks*, Ilaria Chillotti, Marc Joye, Pascal Paillier, 2 types of operations are defined:
- those called leveled, which are fast; for example, addition or multiplication by a constant,
- those which are called bootstrapped and which are significantly slower; for example comparison, which take several tens of times longer than leveled operations, so that leveled operations (and in general all non-bootstrapped operations) are nowadays in practice neglected in favor of bootstrapped operations.

Comparing a reference biometric data of a database and a freshly captured data called a candidate, can be done by calculating a distance, in particular a scalar product. And membership in the database, especially for its identification, is determined by comparing normalized scores to a threshold.

It is thus understood that verification in the homomorphic domain that a candidate biometric data belonging to a database of 10,000 reference biometric data implies 10,000 scalar products and 10,000 comparisons, which can take several minutes, an unacceptable duration for real-time use.

If one wanted to confidentially compare even two complete databases of 10,000 reference biometric data (for example, from cooperating police forces in different states that want to know if individuals are in their respective biometric databases without disclosing them), then one would have to make a hundred million comparisons in the encrypted domain, which is out of reach.

It would therefore be desirable to have a simple, reliable, secure, and much faster solution for querying a database.

PRESENTATION OF THE INVENTION

According to a first aspect, the invention relates to a method for processing personal data, characterized in that it comprises the carrying out by a system of steps of:
- (a) For each reference personal data of a reference personal database, calculating in the encrypted domain a similarity rate of the reference personal data with a candidate personal data; said reference personal database being associated with a first partition into a plurality of first sets of reference personal data, and with a second partition into a plurality of second sets of reference personal data, such that each reference personal data of a reference personal database belongs to a single first set and a single second set;
- (b) For each first set and each second set, calculating in the encrypted domain an overall similarity rate of said set based on the similarity rates of the reference personal data of said set;
- (c) Comparing in the encrypted domain each overall similarity rate of a first set with a first predetermined threshold, and each overall similarity rate of a second set with a second predetermined threshold.

According to advantageous and non-limiting features:

Step (b) comprises applying a strictly convex function to the similarity rates of the reference personal data.

Said strictly convex function is a power function of order greater than 1.

The overall similarity rate of a set is calculated in step (b) as the sum of the similarity rates of the reference personal data of said set after applying said strictly convex function.

The first and second partitions are such that each second set contains a single reference data from each first set.

Said reference personal database contains m*n reference personal data, with m and n two integers, and there are n first sets of m reference personal data and m second sets of n reference personal data, such that for any j≤n, the j-th second set contains the j-th reference personal data of each first set.

The candidate personal data and/or each reference personal data is encrypted in a homomorphic way, in particular in a fully homomorphic way.

Said personal data are biometric data

Step (a) comprises obtaining said candidate biometric data from a biometric trait of the user, employing biometric acquisition means of the system.

Said similarity rate of two personal data is calculated in step (a) as the scalar product of these personal data.

Step (a) comprises, for each reference personal data, calculating in the encrypted domain a similarity rate of the reference personal data with a sum of at least two candidate personal data.

The method comprises a step (d) of identifying at least one reference personal data belonging to both a first set with an overall similarity rate higher than said first threshold and a second set with an overall similarity rate higher than said second threshold.

According to a second aspect, the invention proposes a biometric data processing system, characterized in that it is configured for the carrying out of steps of:
(a) For each reference personal data of a reference personal database, calculating in the encrypted domain a similarity rate of the reference personal data with a candidate personal data; said reference personal database being associated with a first partition into a plurality of first sets of reference personal data, and with a second partition into a plurality of second sets of reference personal data, such that each reference personal data of a reference personal database belongs to a single first set and a single second set;
(b) For each first set and each second set, calculating an overall similarity rate of said set based on the similarity rates of the reference personal data of said set;
(c) Comparing each overall similarity rate of a first set with a first predetermined threshold, and each overall similarity rate of a second set with a second predetermined threshold.

According to a third and a fourth aspect, the invention relates to a computer program product comprising code instructions for the execution of a method according to the first aspect of processing personal data; and a storage means readable by a computer equipment on which a computer program product comprises code instructions for the execution of a method according to the first aspect of processing personal data.

DESCRIPTION OF THE FIGURES

Other characteristics, purposes and advantages of the present invention will be seen from the following detailed description with regard to the appended figures, provided by way of non limiting examples, and wherein.

DETAILED DESCRIPTION

Figure 1:
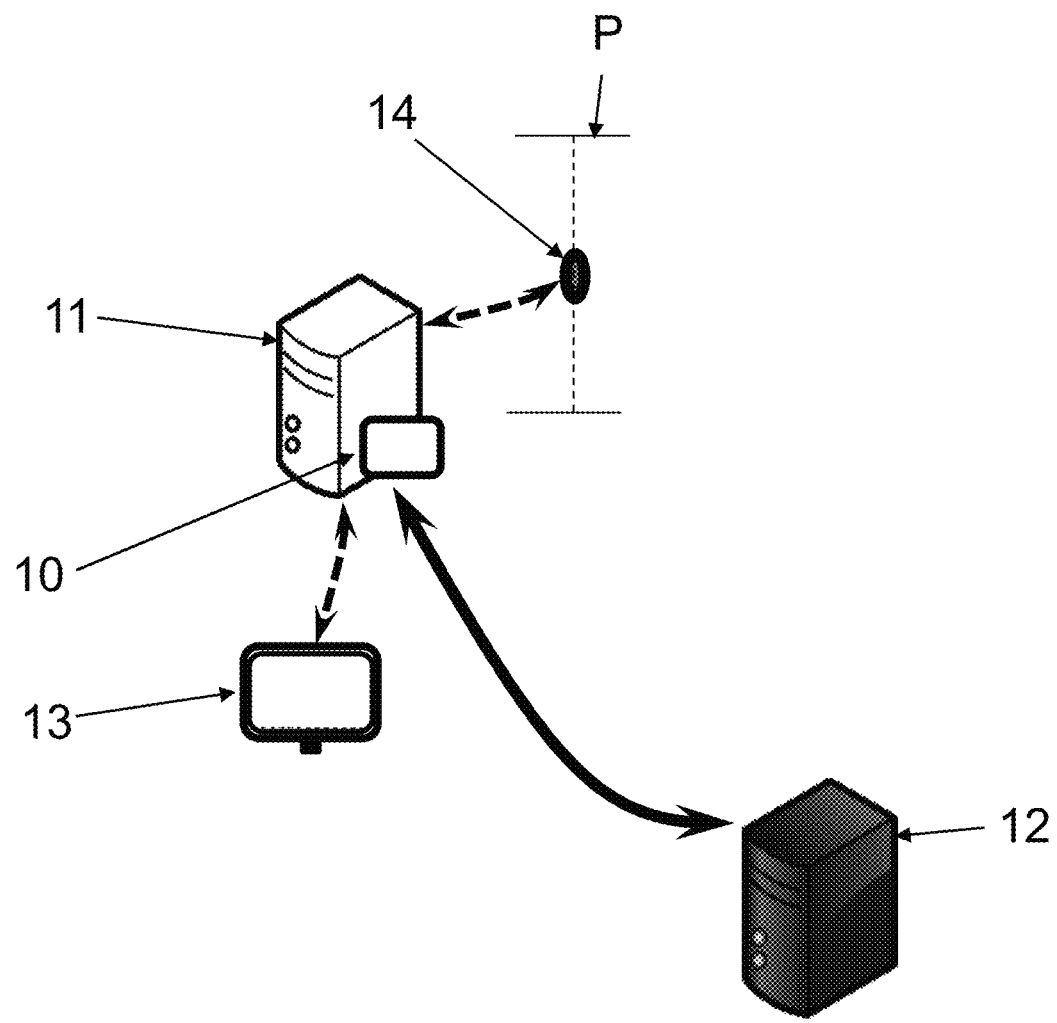
FIG. 1 schematically represents a preferred embodiment of a system for carrying out a method according to the invention.

With reference to FIG. 1, a system 1 for processing personal data for the carrying out of a method for processing personal data, especially for the identification of individuals, is schematically represented.

This system 1 is equipment owned and controlled by an entity in regard to which the identification is to be performed, for example, a governmental or customs entity, a company, etc.

By personal data, biometric data is meant in particular (and this example will be used in the rest of the present description), but it will be understood that this may be any data specific to an individual on the basis of which it is possible to authenticate a user, such as alphanumeric data, a signature, etc.

Conventionally, the system 1 comprises a data processing module 11, i.e. a computer such as for example a processor, a microprocessor, a controller, a microcontroller, an FPGA, etc. This computer is suitable for executing code instructions to carry out, if necessary, part of the data processing that will be presented below.

The system 1 also comprises a data storage module 12 (a memory, for example flash) and advantageously a user interface 13 (typically a screen), and biometric acquisition means 14 (see below).

The system 1 may be provided locally, but can be separated into one or even more remote servers hosting the electronic components (modules 11, 12) connected to the biometric acquisition means 14 that must necessarily remain on-site (at the gate for access control). In the example of FIG. 1, storage module 12 is remote.

In the preferred biometric embodiment, the system 1 is capable of generating so-called candidate biometric data from a biometric trait of an individual. The biometric trait can, for example, be the shape of the face, one or more irises of the individual, a fingerprint, etc. The extraction of the biometric data is performed by processing the image of the biometric trait, which depends on the nature of the biometric trait. Various image processing methods to extract biometric data are known to the person skilled in the art, for example coding via a convolutional neural network (CNN). By way of nonlimiting example, the extraction of the biometric data can comprise an extraction of particular points, of a shape of the face in the case where the image is that of the individual's face, or of a map of features.

The biometric acquisition means 14 therefore typically consist of an image sensor, for example a digital still apparatus or a digital camera, suitable for acquiring at least one image of a biometric trait of an individual, see below.

Typically, there will always be at least one candidate personal data and a plurality of reference personal data to compare (that is each candidate personal data must be compared with each reference personal data), if alphanumeric personal data is used the candidate data can be simply entered on the means 13 or for example obtained by optical reading from an image.

The data storage module 12 thus stores a reference personal database, that is, a plurality of "expected" personal data of a plurality of known individuals.

Each reference personal data may advantageously be a data recorded in an identity document of the individual. For example, the personal data can be the biometric data obtained from an image of the face appearing on an identity document (for example a passport), or even an image (or directly the extracted biometric data, i.e. the template) of the face, at least one iris or at least one fingerprint of the individual, or at least one recorded in a radiofrequency chip contained in the document.

As we will see, it is assumed that the candidate personal data and/or the reference personal data are encrypted in a homomorphic way, in particular in a Fully Homomorphic Encryption (FHE) way.

It is recalled that a homomorphic cryptographic system makes it possible to perform certain mathematical operations on previously encrypted data instead of cleartext data. Thus, for a given calculation, it becomes possible to encrypt the data, perform certain calculations associated with said given calculation on the encrypted data, and to decrypt them, obtaining the same result as if said given calculation had been performed directly on the cleartext data.

Use is made, for example, of the Brakerski-Gentry-Vaikuntanathan (BGV), Cheon-Kim-Kim-Son (CKKS), Fast Fully Homomorphic Encryption Over the Torus (TFHE) or else Brakerski/Fan-Vercauteren (BFV) encryptions, which are entirely homomorphic.

In one embodiment, the system 1 carries out an identification of the individual, that is compares the candidate personal data (newly acquired from the individual in the case of biometric data, or otherwise simply requested from the individual if it is alphanumeric data for example), to all the reference personal data from said database, in order to determine the identity of the individual. This differs from authentication, in which the candidate personal data would be compared only to a single reference personal data, supposedly coming from the same individual, in order to verify that the individual from whom both data were obtained is indeed the same.

The system 1 can finally comprise access control means (for example an automatic gate P in FIG. 1) controlled based on the result of the identification: if an authorized user is recognized, access is authorized. Said biometric acquisition means 14 can be directly mounted on said access control means.

According to another embodiment, the system 1 carries out a database comparison, i.e. said reference personal database is called the "first database", and there is a candidate personal database, called the "second database". "Comparing databases" is intended to mean, as explained, the comparison of their elements, in particular with a view to determining (and where appropriate identifying) if at least one element is present simultaneously in the first database and the second database. In other words, preferably, the result of said comparison is the intersection of the first and second databases. The second database can be provided directly encrypted in a way that is homomorphic to the system 1, or stored on additional means 12.

Instead of comparing the threshold scores one by one (bootstrapped operation in the encrypted domain), the present invention proposes to use a method called pool testing and to test several scores at the same time. By analogy, if you want to identify a faulty bulb on a string of lights, you can test groups of bulbs at the same time rather than each bulb independently.

Following this pool testing principle, if all the tested scores are brought to negative comparisons (i.e. if they have a "no match", then their collective comparison will also be negative and will ultimately cost only one comparison.

To apply pool testing to a personal database, we associate the reference personal database with a double partition:
- a first partition into a plurality of first reference personal data sets, and
- a second partition into a plurality of second reference personal data sets, Naturally, there are fewer first sets and second sets than the number of reference personal data in the database (i.e. at least one first set and at least one second set contains at least two reference personal data), and preferentially each first set and/or each second set contains at least two reference personal data.

The first and second partitions are such that each reference personal data of a reference personal database belongs to a unique first set and a unique second set, i.e. each reference personal data of a reference personal database is entirely defined by a pair of a first and a second set, which represent "coordinates" of the reference personal data.

Conversely, the first and second partitions are advantageously such that each second set contains a single reference personal data from each first set. In other words, each pair of a first set and a second set has a non-empty intersection, comprising a single reference personal data from the database. This ensures that the function that associates a reference personal data from the database with the pair of a first set and a second set which contains it is bijective (existence and uniqueness of the pair).

Many partition schemes are known to achieve these properties, but as a preferred example, if said reference personal database contains m*n reference personal data, with m and n being two integers (for example, 100*100 for a 10,000-item database), there are n first sets of m reference personal data and m second sets of n reference personal data, such that for any $j \leq m$ ($j \in [[1; m]]$), the j-th second set contains the j-th reference personal data of each first set.

Incidentally, for any $i \leq n$ ($i \in [[1; n]]$), the i-th first set contains the i-th reference personal data of every second set.

Mathematically we can represent in this preferred embodiment the reference personal database as a matrix of dimensions n*m, and:
- The i-th row of the matrix is the i-th first set; and
- The j-th column of the matrix is the j-th second set.

Thus each reference personal data can be denoted by a pair $(i,j) \in [[1; n]] * [[1; m]]$, and denoted $\text{ref}_{i,j}$.

Figure 2:
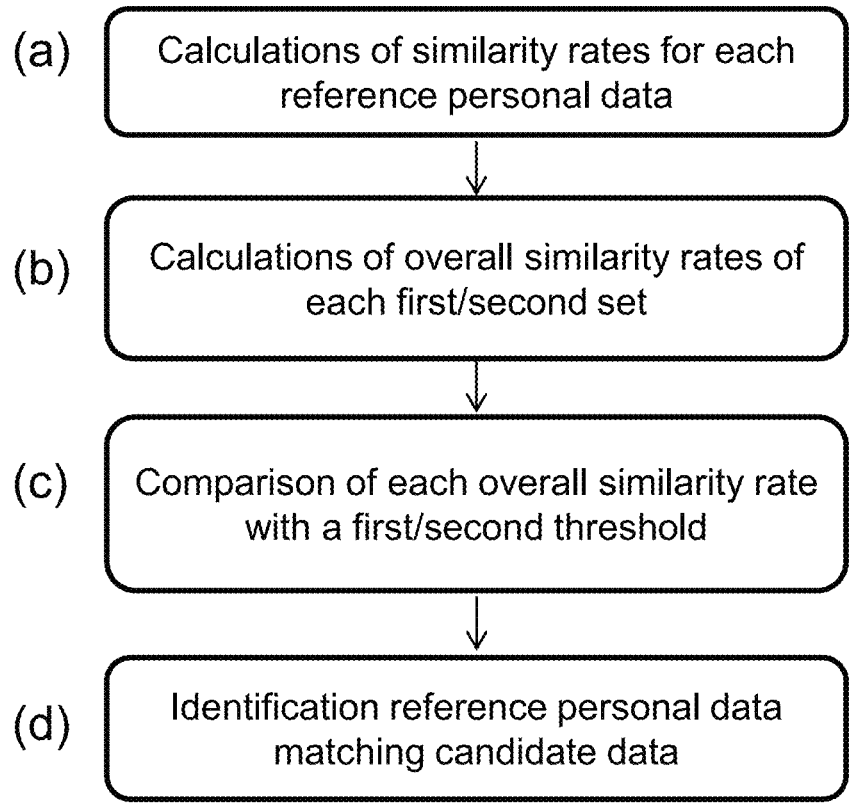
FIG. 2 illustrates the steps of an embodiment of a method according to the invention.

With reference to FIG. 2, the method starts with a step (a), carried out for each reference personal data of the reference personal data base, of calculating in the encrypted domain a similarity rate of the reference personal data with a candidate personal data. In the case of a plurality of candidate personal data, the method can be repeated as many times as there are candidate data, or they can be processed "in batches" (and the method repeated only as many times as there are batches), see below.

It is assumed that the homomorphic encryption has taken place before, otherwise the personal data is encrypted in step (a). Typically, all the steps in this method will take place in the encrypted domain so that personal data cannot be traced.

It is important to understand that in case of biometric identification, the candidate data must be obtained at most a few minutes before, to guarantee the "freshness" of this candidate data.

As explained, the system 1 further advantageously comprises biometric acquisition means 14 for obtaining said candidate biometric data. Generally, the candidate biometric data is generated by the data processing module 11 from a biometric trait supplied by the biometric acquisition means 14, but the biometric acquisition means 14 can comprise their own processing means and for example take the form of an automatic device provided by the control authorities to extract the candidate biometric data.

Preferably, the biometric acquisition means 14 are capable of detecting living beings, so as to ensure that the candidate biometric data comes from a "real" trait.

The calculation in step (a) is the same as in the prior art. It is understood that the individual is considered identified if the calculation from step (a) reveals a similarity rate between the candidate data and a reference data exceeding a certain threshold, the definition whereof depends on the calculated distance. It is thus possible to obtain data representative of the result of said comparison, which is a result of identification of the individual, i.e. typically a Boolean of database membership.

By similarity rate, we mean any score decreasing with the distance between the candidate data and the reference data. In other words, the similarity rate tends to a maximum value (typically 1) when the distance between the candidate data and the reference data tends to 0.

Preferably, said similarity rate of two personal data is calculated in step (a) as the scalar product of that personal data (advantageously normalized so as to have a value in the interval [0; 1]—rate from 0 to 100%, although other intervals may be taken). Note that we can also use for example a discrete "level" of similarity to limit the amount of information, or a slightly noisy version.

However, as explained we cleverly avoid making a comparison of each similarity rate with the threshold, since comparisons in the encrypted domain are very expensive (bootstrapped operations).

In step (b), the pool testing is carried out, and for each first set and each second set, an overall similarity rate of the said set is calculated in the encrypted domain as a function of the similarity rates of the reference personal data of said set.

In the example of the matrix we have an overall similarity rate for each row and each column of the matrix, i.e. m+n overall rates, which is a number much lower than the number m*n of elements of the database. Moreover, each calculation is inexpensive because we only do non-bootstrapped operations in the encrypted domain.

To test multiple similarity rates together, we propose:
1. to add them, and/or
2. to make them undergo an individual operation, the idea being to "crush" (make negligible) the weak similarity rates. The threshold is then modified accordingly.

Thus, step (b) advantageously comprises the application of a strictly convex function (on the set of values of the similarity rate, in particular the segment [0; 1]) to the similarity rates of the reference personal data, said strictly convex function is typically a power function of an order greater than 1, for example a square, but also for example an exponential function. Recall that a strictly convex function is a function defined on a real interval I (here the segment such that [0; 1]), such that for all x and y of I and all t in ]0; 1[ we have $f(t*x+(1-t)*y) < t*f(x)+(1-t)*f(y)$, which translates a form of "hollow" of the function seen from above.

Note that we understand that inverting the similarity rates (by taking for example 1—similarity rate, or directly the distance) and then applying a concave function to them would be like applying a convex function to them. Generally speaking, we are referring here to any operation that "reinforces" the scores representative of similar personal data at the expense of the scores representative of different personal data.

Preferably, in the case of a power function, one can choose an order p of the power function as a function of the size of the set, for example equal to $2*\log_{10}$ of the number of reference personal data in the set (m or n), i.e. order p=2 for sets of 10 items and order p=4 for sets of 100 items, in the case of a face type biometry.

We understand that we would have solved the problem perfectly with the max function (but this would have been impossible because it would have required expensive bootstrapped operations). The idea here is then comparable to that of "p-norms": denoting $\|x\|_p = (x_1^p + \ldots + x_n^p)^{1/p}$ (for example, $\|x\|_2$ is the Euclidean norm, and $\|x\|_\infty = \max(x_i)$, the infinite norm), with $x_i \ldots x_n$ the reference data of a set. Thus, as p increases, the norm p approaches the infinite norm, that is the maximum. The intuition behind this result is that as the order p of the power function increases, the smaller values of $x_i$ are rendered negligible by being raised to the power p while only the maximum value remains decisive.

In summary, in the preferred embodiment, step (b) consists of (1) applying, for each reference personal data, the power function of order p to the similarity rate of that reference personal data (i.e., m*n*p non-bootstrapped operations when p is a positive integer—because exponential calculations amounts to multiplication), and (2) summing, for each first or second set, the similarity rates (after applying the power function) of the reference personal data of said set (i.e. m*(n−1)+n*(m−1) non-bootstrapped operations).

Finally, in a step (c), each overall similarity rate of a first set is compared with a first predetermined threshold, and each overall similarity rate of a second set is compared with a second predetermined threshold. The existence of two different thresholds is due to the fact that the first and second sets do not necessarily have the same number of elements, but in the case where m=n (100 in the example) there is advantageously a common threshold. Said first and second thresholds are advantageously a function of the base threshold, the number of items (m or n) in the set, and the function applied to the similarity rates.

To determine said first and second thresholds, one can, for example, draw FAR (false acceptance rate) and FRR (false rejection rate) curves for comparisons between a candidate personal data and a reference personal data at the scale of a complete database (see below), and proceed in the same way for a set: one chooses in the usual way (as first/second threshold) a threshold which is at a sufficiently low acceptance rate while having an acceptable false negative probability rate.

If a reference personal data coincides with the candidate personal data (i.e. their similarity rate is above the threshold), then the first set and the second set to which this reference personal data belongs will have overall similarity rates above the first and second thresholds, respectively (due to the presence of the high similarity rate—which would not have been overwritten by the power function—in the corresponding sums).

It is understood that in step (c) we only have in practice m+n comparisons i.e. m+n bootstrapped operations, instead of m*n, i.e. 20 times less bootstrapped operations if m=n=100

The method preferentially comprises a step (d) of identifying at least one reference personal data belonging to both a first set with an overall similarity rate higher than said first threshold and a second set with an overall similarity rate higher than said second threshold, each identified reference data "matching" the candidate data. If the reference personal database is "clean" without duplicates, a candidate data matches at most one reference data, so that the individual to whom the candidate data belongs can be identified as the one associated with the matched reference data. Indeed, we have powerful biometric recognition algorithms, which for a required FAR (False acceptance rate) of $10^{-6}$, ensure a FRR (false rejection rate) of about $10^{-3}$.

Finally, step (d) may comprise carrying out access control based on the identification result of reference personal data matching the candidate personal data. In other words, if the individual to whom the candidate personal data belongs has been correctly identified, that person is "authorized" and other actions such as the opening of the automatic gate P may occur.

Alternatively, step (d) may comprise determining whether at least one personal data is present simultaneously in the first database and the second database based on the result of the comparisons. More precisely, if a candidate personal data (from the second database) matches a reference personal data (from the first database), then that personal data is present in both databases. To reiterate, this is biometric data in particular, so that there will never be two identical items, but it is possible to conclude that there is a single individual whom both the candidate and reference personal data match.

Note that more sophisticated strategies can be found, especially in step (d) depending, for example, on the number of items in the database, the maximum number of items desired to be in a sum, or the number of expected matches (see for example the paper Huseyin A. Inan, Peter Kairouz, Ayfer Özgür, *Sparse Combinatorial Group Testing. IEEE Trans. Inf. Theory* 66(5) 2020. Other parameters can also be taken into account when developing these strategies.

In general, the person skilled in the art will be able to follow pool testing strategies taking into account:
- The number of defectives (here 1, but you never know?)
- The maximum amount of data used in a test,
- Whether a comparison returns a result that is always correct or can be wrong,
- Etc.

If there are several candidate personal data, and in particular a second database, the process can be repeated for each candidate personal data.

For operational reasons (parallelization of resources), it may be desirable to proceed according to the same principle in batches. For example, we can test several candidate data at the same time for their membership in the database by altering on the linearity of the scalar product: assuming 2 candidate personal data at the same time, it is possible to compute the scalar products <cand1+cand2, ref> for all reference personal data in the database, since <cand1+cand2, ref>=<cand1, ref>+<cand2, ref>. Inasmuch as almost all of these scalar products are close to 0, we know that if <cand1+cand2, ref>> matching threshold then either <cand1+cand2, ref>≈<cand1, ref> or <cand1+cand2, ref>≈<cand2, ref>, i.e. <cand1, ref> or <cand2, ref>> threshold, which is equivalent to saying that at least one of said tested candidate data belongs to the database.

Step (a) may therefore advantageously comprise, for each reference personal data, calculating in the encrypted domain a similarity rate of the reference personal data with a sum of at least two candidate personal data. Indeed, a candidate data need only belong to the database for one of the scores to be high. If several of the tested candidate data are in the database, we will have several of first sets and several of second sets which will have overall similarity rates above the first/second thresholds (step (d)): it is then sufficient to test the possible pairs (their number is very small) to know which of the plurality of tested candidate data belongs to the database and to identify it.

It is thus possible to divide a possible second database into a plurality of batches of, for example, a dozen candidate personal data, and to carry out the process as many times as there are batches, it being understood that the number of batches remains much smaller than the number of candidate data.

According to a third and a fourth aspect, the invention relates to a computer program product comprising code instructions for the execution (in particular on the data processing module 11 and/or the hardware security module 10 of the system 1) of a method according to the first aspect of the invention, as well as storage means readable by computer equipment (a data storage module 12 of the system 1 and/or a memory space of the hardware security module 10) on which this computer program product is found.

The invention claimed is:

1. A method for processing personal data, comprising the carrying out by a system of steps of:
    (a) For each reference personal data of a reference personal database, calculating in the encrypted domain a similarity rate of the reference personal data with a candidate personal data; said reference personal database being associated with a first partition into a plurality of first sets of reference personal data, and with a second partition into a plurality of second sets of reference personal data, such that each reference personal data of a reference personal database belongs to a single first set and a single second set;
    (b) For each first set and each second set, calculating in the encrypted domain an overall similarity rate of said set based on the similarity rates of the reference personal data of said set;
    (c) Comparing in the encrypted domain each overall similarity rate of a first set with a first predetermined threshold, and each overall similarity rate of a second set with a second predetermined threshold;
    wherein the candidate personal data and/or each reference personal data is encrypted in a homomorphic way.

2. The method according to claim 1, wherein step (b) comprises applying a strictly convex function to the similarity rates of the reference personal data.

3. The method according to claim 2, wherein said strictly convex function is a power function of order greater than 1.

4. The method according to claim 2, wherein the overall similarity rate of a set is calculated in step (b) as the sum of the similarity rates of the reference personal data of said set after applying said strictly convex function.

5. The method according to claim 1, wherein the first and second partitions are such that each second set contains a single reference data from each first set.

6. The method according to claim 5, wherein said reference personal database contains m*n reference personal data, with m and n two integers, and there are n first sets of m reference personal data and m second sets of n reference personal data, such that for any j≤n, the j-th second set contains the j-th reference personal data of each first set.

7. The method according to claim 1, wherein said personal data are biometric data.

8. The method according to claim 1, wherein said similarity rate of two personal data is calculated in step (a) as the scalar product of these personal data.

9. The method according to claim 1, wherein step (a) comprises, for each reference personal data, calculating in the encrypted domain a similarity rate of the reference personal data with a sum of at least two candidate personal data.

10. The method according to claim 1, comprising a step (d) of identifying at least one reference personal data belonging to both a first set with an overall similarity rate higher than said first threshold and a second set with an overall similarity rate higher than said second threshold.

11. A biometric data processing system, wherein said biometric data processing system is configured for the carrying out of steps of:
    (a) For each reference personal data of a reference personal database, calculating in the encrypted domain a similarity rate of the reference personal data with a candidate personal data; said reference personal database being associated with a first partition into a plurality of first sets of reference personal data, and with a second partition into a plurality of second sets of reference personal data, such that each reference personal data of a reference personal database belongs to a single first set and a single second set;
    (b) For each first set and each second set, calculating an overall similarity rate of said set based on the similarity rates of the reference personal data of said set;

(c) Comparing each overall similarity rate of a first set with a first predetermined threshold, and each overall similarity rate of a second set with a second predetermined threshold;

wherein the candidate personal data and/or each reference personal data is encrypted in a homomorphic way.

12. A non-transitory computer program product comprising code instructions which, when executed by a processor, cause the processor to perform a method comprising the steps of:
(a) For each reference personal data of a reference personal database, calculating in the encrypted domain a similarity rate of the reference personal data with a candidate personal data; said reference personal database being associated with a first partition into a plurality of first sets of reference personal data, and with a second partition into a plurality of second sets of reference personal data, such that each reference personal data of a reference personal database belongs to a single first set and a single second set;
(b) For each first set and each second set, calculating in the encrypted domain an overall similarity rate of said set based on the similarity rates of the reference personal data of said set;
(c) Comparing in the encrypted domain each overall similarity rate of a first set with a first predetermined threshold, and each overall similarity rate of a second set with a second predetermined threshold;

wherein the candidate personal data and/or each reference personal data is encrypted in a homomorphic way;

wherein said method is executed on a computer.

13. A storage means readable by computer equipment on which a computer program product comprises code instructions for the execution of a method comprising the steps of:
(a) For each reference personal data of a reference personal database, calculating in the encrypted domain a similarity rate of the reference personal data with a candidate personal data; said reference personal database being associated with a first partition into a plurality of first sets of reference personal data, and with a second partition into a plurality of second sets of reference personal data, such that each reference personal data of a reference personal database belongs to a single first set and a single second set;
(b) For each first set and each second set, calculating in the encrypted domain an overall similarity rate of said set based on the similarity rates of the reference personal data of said set;
(c) Comparing in the encrypted domain each overall similarity rate of a first set with a first predetermined threshold, and each overall similarity rate of a second set with a second predetermined threshold;

wherein the candidate personal data and/or each reference personal data is encrypted in a homomorphic way.

\* \* \* \* \*